May 5, 1959 R. A. KRAFT 2,885,473
NON-BLOCKING WAVE RECEIVER CIRCUIT WITH AUTOMATIC GAIN CONTROL
Filed Nov. 8, 1954
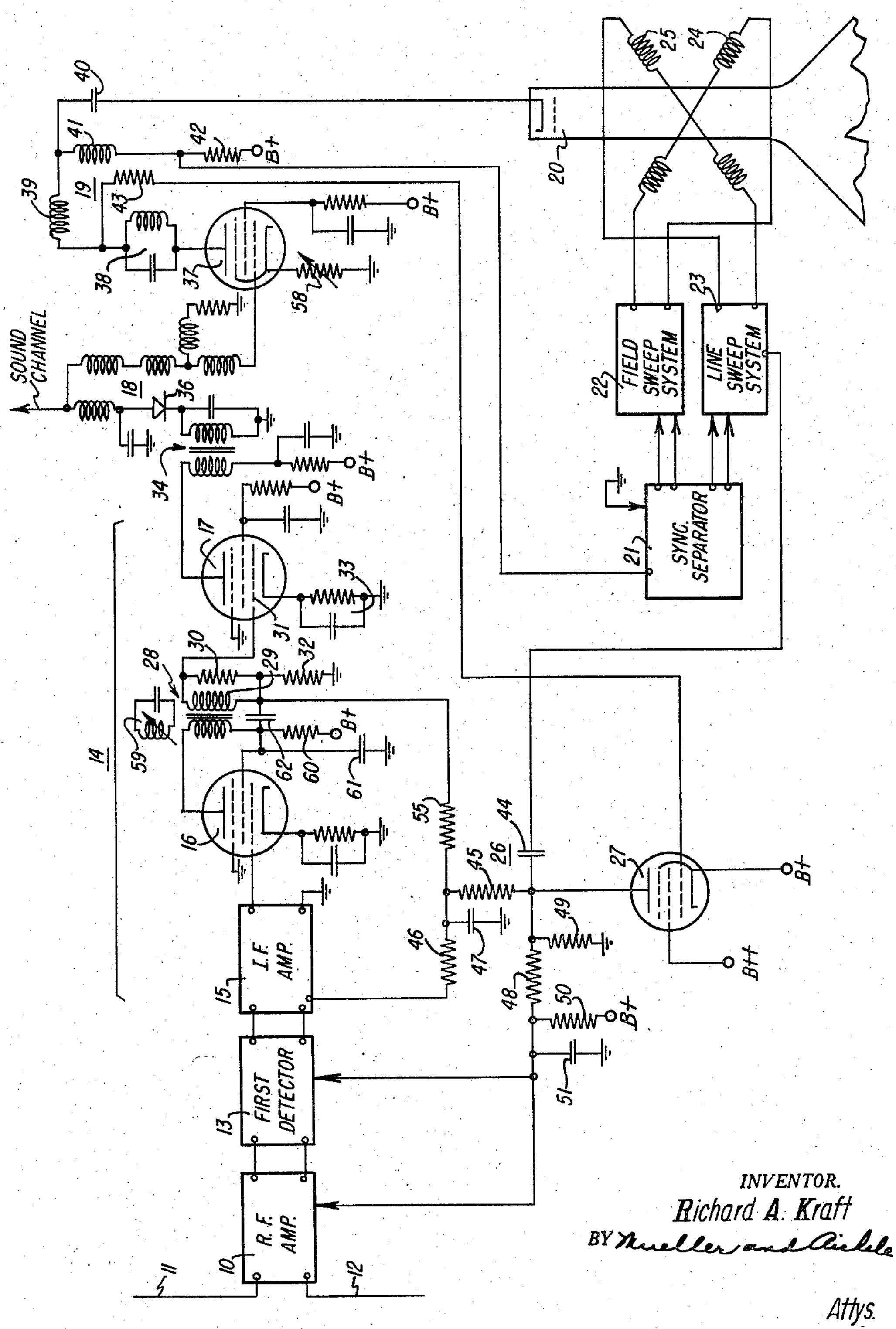
INVENTOR.
Richard A. Kraft
BY Mueller and Aichele
Attys.

United States Patent Office 2,885,473

Patented May 5, 1959

2,885,473

NON-BLOCKING WAVE RECEIVER CIRCUIT WITH AUTOMATIC GAIN CONTROL

Richard A. Kraft, Elmhurst, Ill., assignor to Motorola, Inc., Chicago, Ill., a corporation of Illinois Application November 8, 1954, Serial No. 467,450

6 Claims. (Cl. 178—7.3)

The present invention relates to wave signal receivers of the type having an automatic gain control incorporated therein, and more particularly to a receiver which is so constructed that blocking thereof in the presence of excessively strong signals is prevented.

It sometimes happens in television and other receivers of the type incorporating an automatic gain control system that blocking occurs in the final stage of the intermediate frequency amplifier. This blocking usually arises when the receiver is tuned from one station to another, since the automatic gain control (AGC) circuit increases the gain of the receiver to a maximum during the between-station interval, so that signal to which the receiver is tuned is translated through the receiver with maximum gain. This has a tendency to cause the discharge device of the final intermediate frequency amplifier to draw grid current, and it has been found that such grid current flow robs the anode of that device of practically all the space current in the device. Because of this, no signal reaches the automatic gain control circuit and it maintains the receiver in its maximum gain, blocked condition.

One obvious way to correct the blocking situation described above is to insert a grid-leak resistor in the input circuit of the discharge device of the final intermediate frequency amplifier between its control electrode and ground. However, it has been found that the time constant of the input circuit of that amplifier must not exceed a certain maximum which in most present day television receivers is of the order of .72 miscrosecond. If the time constant exceeds that maximum the receiver becomes susceptible to what is termed "white noise." This type of noise is due to the charging of the input circuit by noise bursts and resulting paralysis of the amplifier for a time interval corresponding to the time constant of the input circuit. It has also been found that a time constant greater than this maximum is obtained when a grid-leak resistor of sufficient value to prevent blocking by the AGC action is inserted in the input circuit as described above. Therefore, when the grid-leak resistor is made large enough to overcome the blocking tendency the receiver becomes susceptible to "white noise."

It is an object of the present invention to provide a receiver which is constructed to incorporate an improved circuit for removing the blocking of the intermediate frequency amplifier in the presence thereat of excessive signal intensities and which achieves this without lengthening the time constant of the input circuit of the amplifier to such an extent so as to render the receiver susceptible to "white noise."

A feature of the invention is the provision of a television receiver in which the input circuit of one of the stages of the intermediate frequency amplifier is constructed to develop a negative voltage or potential whenever the control electrode of its discharge device draws current, and this negative potential is supplied to the AGC circuit of the receiver to reduce the gain of the preceding stages in the receiver so as to prevent blocking of the receiver.

The above and other features of the invention which are believed to be new are set forth with particularity in the appended claims. The invention itself, however, together with further objects and advantages thereof, may best be understood by reference to the following description when taken in conjunction with the accompanying drawing in which the single figure shows a television receiver constructed in accordance with the invention.

The invention provides a television receiver which comprises a plurality of cascade-connected intermediate frequency stages, with a discharge device being included in one of the stages and having a control electrode which is subject to draw grid current and block the discharge device in the presence of high intensity signals thereat. Direct current impedance means, such as a resistor, is connected between the control electrode and a point of reference potential; and this impedance means develops a negative voltage thereacross in response to current flow in the control electrode. Circuit means including a detector is coupled to the output of the intermediate frequency amplifier stages, and an automatic gain control circuit is coupled to the circuit means and includes an output network for developing an automatic gain control potential negative with respect to the reference potential for application to at least some of the intermediate frequency amplifier stages to control the gain thereof. Finally, a connection is made from the direct current impedance means to the output network of the AGC circuit for developing a negative voltage in the output network in response to current flow in the control electrode thereby to reduce the gain of the controlled ones of the intermediate frequency amplifier stages.

The receiver of Fig. 1 includes a radio frequency amplifier 10 having input terminals connected to a suitable antenna 11, 12, and having output terminals coupled through a first detector 13 to an intermediate frequency amplifier 14. Intermediate frequency amplifier 14 includes one or more stages shown by the block 15 which are cascade-coupled in usual manner, with the last two succeeding stages therein including respectively first and second electron discharge devices 16 and 17.

The output of the cascade-coupled intermediate frequency amplifier stages is coupled to a circuit means including a detector 18 and a video amplifier 19. The video amplifier is coupled to the input electrode of a cathode-ray image reproducing device 20 and also to a synchronizing signal separator 21. Separator 21 is coupled to a field sweep system 22 and to a line sweep system 23, and the sweep systems are connected respectively to the field deflection yoke 24 and line deflection yoke 25 of the reproducer 20. The video amplifier 19 is also coupled to an automatic gain control circuit 26 including an electron discharge device 27.

A monochrome television signal of present day standards intercepted by antenna 11, 12 is amplified by radio frequency amplifier 10 and heterodyned to the selected intermediate frequency of the receiver in first detector 13. The resulting intermediate frequency signal is amplified in amplifier 14 and demodulated in detector 18. The detector develops a composite video signal which is amplified by video amplifier 19 and supplied to the input electrode of reproducer 20 to control the intensity of the cathode-ray beam therein in known manner. The synchronizing components of the composite video signal are separated in separator 21 and are used to synchronize the field and line sweep systems 22, 23, and therefore, the field and line sweep of device 20. In this manner, the reproducer 20 is able to reproduce the information. The sound portion of the receiver forms no part of the invention and is not shown.

The intermediate frequency amplifier including discharge device 16 is coupled to the succeeding stage through a coupling transformer 28 having a sound trap 59 associated therewith. The primary winding of transformer 28 has one side connected to the anode of device 16 and has its other side connected through a resistor 60 to the positive terminal B+ of a source of unidirectional potential. The screen electrode of device 16 is by-passed to ground through a capacitor 61 and the lower side of secondary 29 is coupled to the lower side of the primary through a capacitor 62. The elements 61, 62 and 32 are connected to form a neutralizing circuit for device 16 which is described in detail and claimed in copending application Serial No. 472,599, filed December 2, 1954, in the name of Lawrence J. Mattingly and assigned to the assignee of the present application. The secondary winding 29 of transformer 28 is shunted by a damping resistor 30, and the upper side of the winding is connected to the control electrode 31 of discharge device 17. The coupling transformer 28 and associated damping resistor 30 constitute the input circuit for device 17, and this input circuit is connected to a point of reference potential or ground through resistor 32. The cathode of device 17 is connected to ground through a usual resistance-capacitance biasing network 33, and the anode of the device is coupled to the second detector 18 through a usual coupling transformer 34.

The connections of detector 18 are known, and need not be described in detail. It is sufficient to state that the detector includes a rectifying device 36 in the form of a diode, crystal rectifier, or other semiconductor device. The rectifier is coupled to the control electrode of an electron discharge device 37 which is connected to constitute video amplifier 19. The cathode of device 37 is connected to the point of reference potential or ground through a variable contrast control resistor 38, and the anode of the device is coupled to the reproducer 20 through a sound trap network 38, a peaking coil 39 and a capacitor 40, all series connected between the anode and an input electrode of the reproducer. The common junction of coil 39 and capacitor 40 is connected to the positive terminal B+ of a source of unidirectional potential through a peaking coil 41 and resistor 42, and the junction of these last two elements is connected to separator 21 for the previously described reasons.

The junction of trap circuit 38 and coil 39 is connected through a resistor 43 to the control electrode of the discharge device 27 forming the AGC circuit 26. The anode of device 27 is coupled through a capacitor 44 to the line sweep system 23 to derive line retrace gating pulses therefrom in any known manner. The cathode of device 27 is connected to the positive terminal B+ to provide the proper operating potentials between the cathode and the control electrode, the latter being directly coupled to the output circuit of video amplifier 19 through resistor 43 as previously noted. The screen electrode of device 27 is connected to the positive terminal B++ of a source of potential higher than the source B+. The anode of device 27 is connected to a pair of series connected resistors 45, 46 which, in conjunction with a grounded filter capacitor 47, form a first output circuit for the AGC circuit. In accordance with the invention, the junction of resistors 45 and 46 is connected through a resistor 55 to the junction of resistors 30 and 32.

The device 27 has a second output circuit connected to its anode which includes a resistor 49 connected from the anode to ground and a series resistor 48. The side of resistor 48 remote from the anode is connected to the positive terminal B+ through a resistor 50 and to ground through a filter capacitor 51. Series resistors 45, 46 connect the anode to the intermediate frequency amplifier 15, and series resistor 48 connects the anode to the radio frequency amplifier 10 and first detector 13.

The automatic gain control circuit 26 operates generally in known manner to provide a selective gain control to the receiver. That is, the control exerted on the intermediate frequency amplifier precedes the control on the units 10 and 13. The amplitude delay to the latter units is produced by the connection through resistor 50 to B+. This drives the respective control electrodes of the devices in the units 10, 13 to a conductive condition which maintains the AGC on these devices ineffective until the negative potential developed by the AGC circuit exceeds a threshold established by this connection. Therefore, for medium intensity signals only the intermediate frequency amplifier 15 is controlled, but for high intensity signals the units 10, 13 are also controlled in addition to the intermediate frequency amplifier.

The AGC circuit described above operates to decrease the susceptibility of the receiver to blocking, however, it has been found that in the presence of excessively strong signals at the final intermediate frequency amplifier blocking of the intermediate frequency amplifier discharge device 17 still occurs. As previously noted, this is caused by control electrode 31 being driven to a conductive condition, thus diverting the current from the anode of that device. This causes the AGC circuit 26 to hold the receiver at full gain so as to maintain the blocked condition. However, with the disclosed circuit, whenever control electrode 31 draws grid current, a negative potential appears across resistor 32. The voltage divider 45, 55 in the output circuit of the AGC circuit is returned to the top of resistor 32 so that any negative voltage across the latter resistor is reflected in the AGC circuit. The negative voltage reduces the gain of the intermediate frequency amplifier 15 which, in turn, causes a decrease in the signal intensity impressed on device 17 so as to remove the blocked condition.

With the arrangement described above, resistor 32 may have a relatively low value so that the time constant of the network formed by this resistor and capacitors 61, 62 is sufficiently short so that the receiver is not susceptible to "white noise." In a constructed embodiment of the invention the following constants were used and these are listed herein merely by way of example and are not intended to limit the invention in any way:

| | | |
|---|---|---|
| Device **17** | | 6CB6 |
| Resistor **30** | kiloohms | 22 |
| Resistor **32** | ohms | 1200 |
| B+ | volts | 150 |
| Resistor **55** | kiloohms | 330 |
| Resistor **45** | do | 820 |
| Capacitor **47** | microfarads | .25 |
| Device **27** | | 6AU6 |
| B++ | volts | 250 |
| Capacitor **61** | micromicrofarads | 560 |
| Capacitor **62** | do | 1000 |

The invention described herein has been used commercially and television receivers constructed in accordance with the invention have been found to exhibit a high degree of immunity to noise interferences of the type described herein and commonly termed as "white noise." At the same time, it has been found that there is no tendency whatever for the receiver constructed in accordance with the invention to block in the presence of excessively strong signals occurring in the input of the final intermediate frequency amplifier.

While a particular embodiment of the invention has been shown and described, modifications may be made and it is intended in the appended claims to cover all such modifications as fall within the true spirit and scope of the invention.

I claim:

1. A wave-signal receiver including in combination, a plurality of cascade-connected signal-translating stages including amplifier stages, an electrode discharge device included in one of said amplifier stages and having a control electrode subject to draw current in the presence of high intensity signals, input circuit means for said discharge device including first resistor means connecting said control electrode to a point of reference potential for developing a negative voltage thereacross in response to current flow in said control electrode, a detector coupled to the output of said amplifier signal-translating stages for demodulating a received wave signal and for producing a detected signal in response thereto, an automatic gain control circuit including an output network for developing an automatic gain control potential negative with respect to said reference potential for application to at least some of said signal-translating amplifier stages to control the gain thereof, means for impressing the detected signal from said detector on said automatic gain control circuit, and second resistor means connecting said first resistor means to said output network, said first and second resistor means having relative values such that essentially no automatic gain control potential is impressed on said discharge device, and said resistor means supplying a negative potential to said output network in response to current flow in said control electrode thereby to reduce the gain of said controlled ones of said signal-translating stages.

2. A superheterodyne television receiver including in combination, a plurality of cascade-connected intermediate frequency amplifier stages, an electron discharge device included in the final one of said stages and having a control electrode subject to draw current in the presence of excessively high intensity signals, said input circuit including first resistor means connecting said control electrode to a point of reference potential and developing a negative voltage thereacross in response to current flow in said control electrode, a detector coupled to the output of said intermediate-frequency amplifier stages for demodulating a received television signal and for producing a composite video signal in response thereto, a video amplifier coupled to said detector, an automatic gain control circuit including an output network for developing an automatic gain control potential negative with respect to said reference potential for application to at least some of said intermediate-frequency amplifier stages to control the gain thereof, means for impressing the composite video signal from said detector on said automatic gain control circuit, and second resistor means connecting said first resistor means to said output network, said first and second resistor means having relative values such that essentially no automatic gain control potential is impressed on said discharge device, and said resistor means supplying a negative potential to said output network in response to current flow in said control electrode, thereby to reduce the gain of said controlled ones of said intermediate-frequency amplifier stages.

3. A superheterodyne television receiver including in combination, a plurality of cascaded intermediate-frequency amplifier stages, an electron discharge device included in one of said stages and including a cathode connected to a point of reference potential and an anode and a control electrode, an input circuit coupled to said control electrode for impressing an intermediate frequency signal corresponding to a received television signal on said control electrode and causing said control electrode to draw current in the presence of high intensity signals so as to block said discharge device, first resistor means connecting said control electrode to a point of reference potential said first resistor means developing a negative voltage thereacross in response to current flow in said control electrode, a detector coupled to said anode for demodulating the received television signal to produce a composite video signal, an automatic gain control circuit including an electron discharge device having a control electrode and an anode, means for impressing the composite video signal from said detector on said last-named control electrode, an output circuit including a second resistor connected to said last-named anode and a capacitor coupling said second resistor to a point of reference potential, said output circuit developing an automatic gain control potential negative with respect to said reference potential, means for connecting said second resistor to at least some of said intermediate-frequency amplifier stages to control the gain thereof, and means including a further resistor connecting said second resistor to said first resistor means for impressing a negative potential on said output network in response to current flow in said control electrode thereby to reduce the gain of said controlled ones of said signal-translating stages, said first resistor means and said further resistor having relative values such that essentially no automatic gain control potential is impressed on said intermediate frequency amplifier discharge device.

4. In a superheterodyne television receiver having a plurality of cascaded signal translating stages applying signals to an intermediate frequency amplifier stage, a detector stage coupled to the intermediate frequency amplifier stage through passive circuit means, and an automatic gain control system controlled by detected signals to develop a gain control potential negative with respect to a reference point and having a direct current circuit connected to at least certain of the signal translating stages for controlling the gain thereof, an auxiliary gain control circuit including in combination, an electron valve in the intermediate frequency amplifier stage, said electron valve having an anode coupled to the detector stage and a control grid and a cathode, circuit means coupled to said cathode and control grid for applying the signals to the electron valve and for biasing the same, said circuit means further including first resistor means interconnected with capacitor means and coupled to said control electrode to form a detector circuit for detection of high level signals to produce a further control potential negative with respect to the reference point, and second resistor means connecting said circuit means to the direct current circuit for applying the further control potential thereto, whereby the further control potential causes control of the gain of the certain signal translating stages by the high level signals in the intermediate frequency amplifier stage.

5. In a superheterodyne television receiver having a radio frequency amplifier stage and first and second intermediate frequency amplifier stages, a detector stage coupled to the second intermediate frequency amplifier stage through passive circuit means, and a gated automatic gain control system controlled by detected signals to develop a gain control potential negative with respect to a reference point and having a direct current circuit connected to the radio frequency amplifier stage and the first intermediate frequency amplifier stage for controlling the gain thereof, an auxiliary gain control circuit including in combination, an electron valve in the second intermediate frequency amplifier stage, said electron valve having a cathode coupled to the reference point through a bias resistor, an anode coupled to the detector stage and a control grid, inductor means for applying signals to said control grid, said inductor means having a first terminal coupled to said control grid and further having a second terminal, first resistor means direct current connected between said second terminal and the reference point, capacitor means direct current connected across said first resistor means thereby providing detection of high level signals to produce a further control potential at said control electrode, and second resistor means connecting said second terminal of said inductor means to the direct current circuit for applying the further control potential thereto, said second resistor means having a value substantially larger than said first resistor means to minimize application of the automatic gain control potential to said electron valve, whereby the further control potential causes control of the gain of the radio frequency amplifier stage and the first intermediate frequency amplifier stage by the high level signals in the second intermediate frequency amplifier stage.

6. In a superheterodyne television receiver having a plurality of cascaded signal translating stages applying video signals to an intermediate frequency amplifier, a detector stage coupled to the intermediate frequency amplifier, and a gated automatic gain control system controlled by detected signals to develop a gain control potential negative with respect to a reference point and having a direct current circuit connected to certain of the signal translating stages for controlling the gain thereof, an auxiliary gain control circuit responsive to signals which exceed a predetermined value, including in combination, an electron valve in the intermediate frequency amplifier, said electron valve having electrodes including an output electrode coupled to the detector stage and first and second input electrodes, circuit means coupled to said input electrodes for biasing said electron valve and for applying the video signals thereto with respect to the reference point, said circuit means including interconnected first resistor means and capacitor means coupled between said first and second electrodes to form a detector circuit for detection of signals which exceed the predetermined value to produce a further control potential negative with respect to the reference point, said first resistor means and said capacitor means having a time constant less than one microsecond to minimize charge up on the noise signals, and second resistor means connecting said circuit means to the direct current circuit for applying the further control potential thereto, said second resistor means having a value large with respect to the value of said first resistor means to minimize application of the gain control potential to said electron valve, whereby the further control potential causes control of the gain of the certain signal translating stages by the signals exceeding the predetermined value in the intermediate frequency amplifier.

References Cited in the file of this patent

UNITED STATES PATENTS 2,756,327 Keizer ---------------- July 24, 1956

OTHER REFERENCES

RCA Model CT-100; Service Data, 1954 NOT 3, 3-31-54.